W. D. LA RUE.
SPRING MOTOR FOR TALKING MACHINES AND THE LIKE.
APPLICATION FILED MAR. 20, 1913.
1,182,576.
Patented May 9, 1916.
3 SHEETS—SHEET 3.
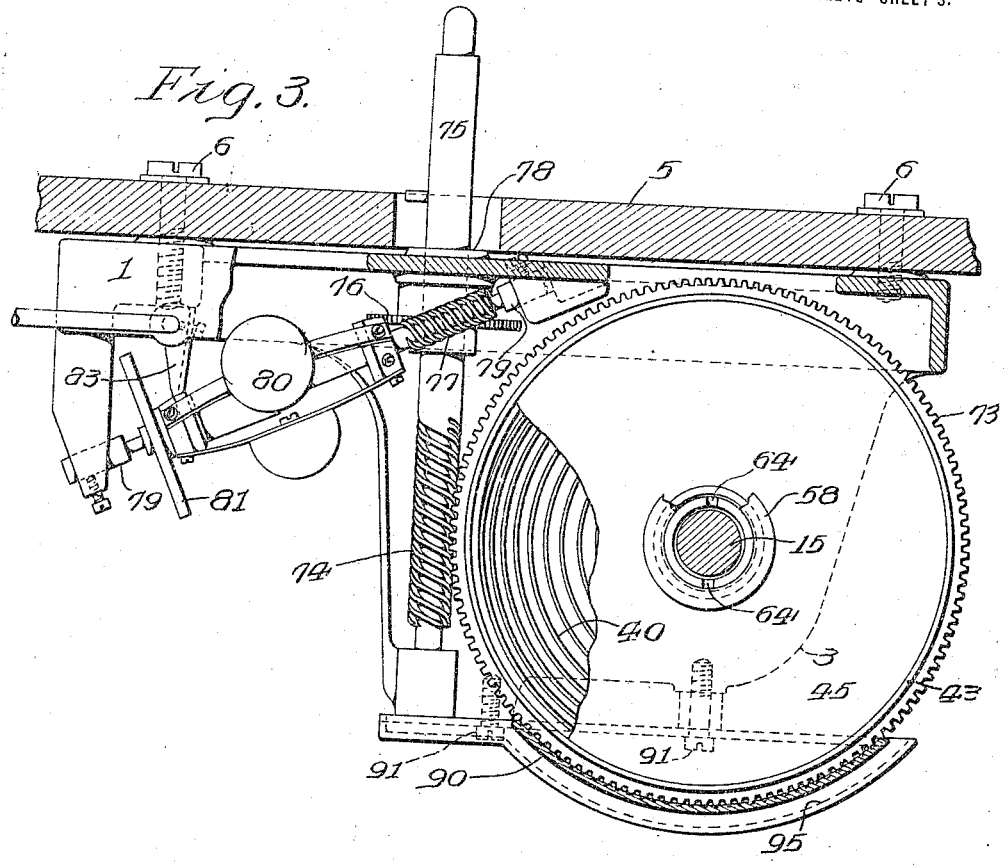
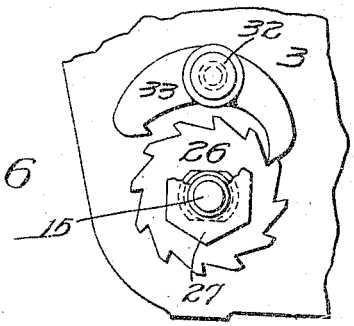
WITNESSES
INVENTOR
William D. La Rue.
BY
ATTORNEY

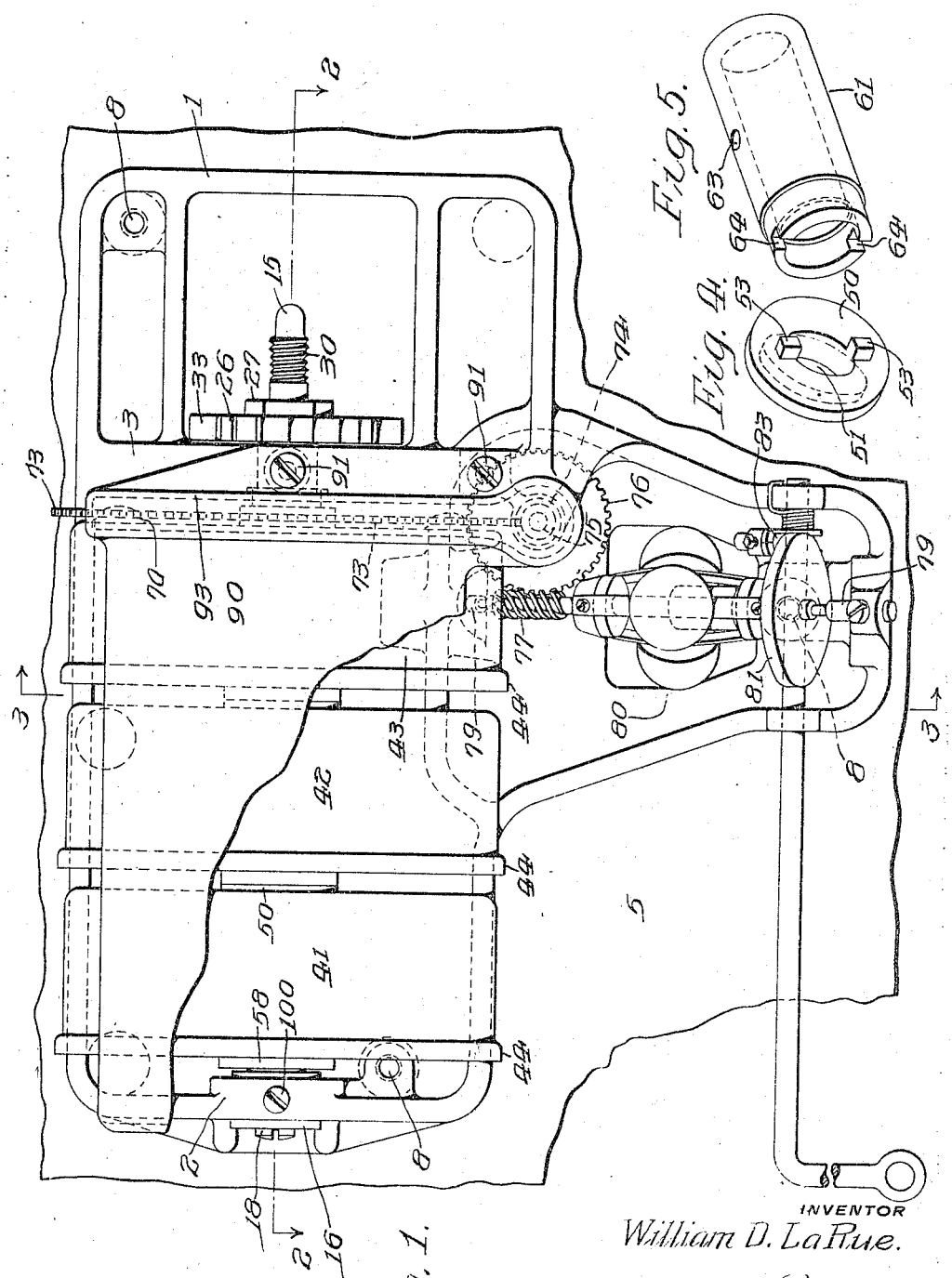

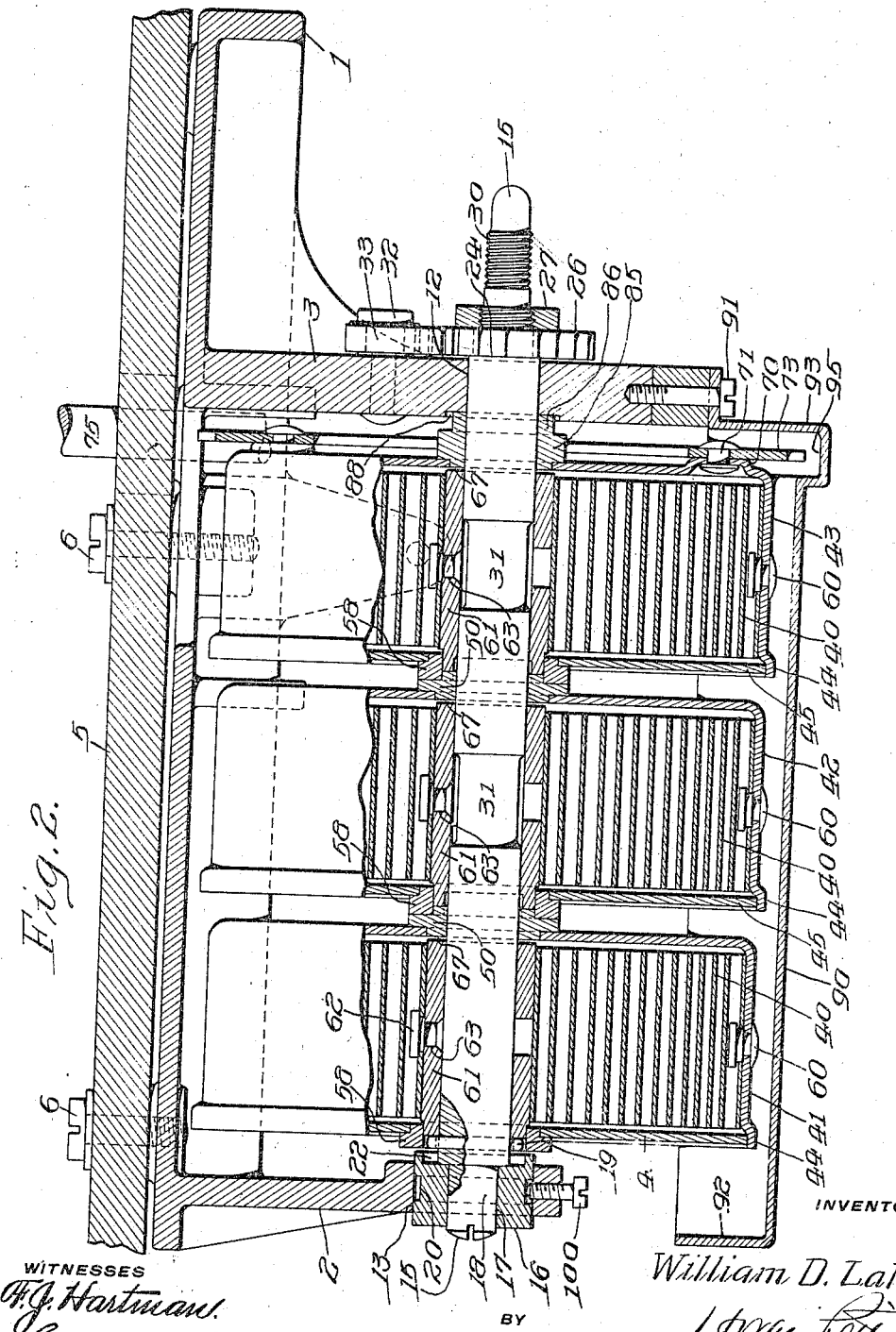

UNITED STATES PATENT OFFICE.

WILLIAM D. LA RUE, OF CAMDEN, NEW JERSEY, ASSIGNOR TO VICTOR TALKING MACHINE COMPANY, A CORPORATION OF NEW JERSEY.

SPRING-MOTOR FOR TALKING-MACHINES AND THE LIKE.

1,182,576.

Specification of Letters Patent.

Patented May 9, 1916.

Application filed March 20, 1913. Serial No. 755,579.

*To all whom it may concern:*

Be it known that I, WILLIAM D. LA RUE, a citizen of the United States, and a resident of Camden, county of Camden, State of New Jersey, have invented certain new and useful Improvements in Spring-Motors for Talking-Machines and the like, of which the following is a specification, reference being had to the accompanying drawings.

The principal objects of this invention are to provide a spring motor having a plurality of springs, each of which is incased in a separate spring barrel forming therewith a self-contained unit, said units being readily interchangeable; to provide a spring motor having a plurality of springs, which may be readily assembled or disassembled, and in which, in case of injury to or weakening of one or more springs, new springs, together with their associated parts may be readily substituted; and to provide a motor in which the various bearing surfaces are kept in constant alinement so that undue friction is minimized and the full power of the springs usefully exerted.

Further objects of this invention are to produce a motor of the type described, of simple and compact design having a minimum of parts, and which is noiseless in operation, which may be constructed at a minimum cost, and which may be taken apart and re-assembled in case of necessity without the employment of a skilled mechanic.

A further object is to provide a means for lubricating the principal gearing of such a motor which will seldom require attention.

Other objects and features of my invention will appear in the following specification, and the drawings forming a part of this application.

In the accompanying drawings, Figure 1 is an inverted plan view of a motor constructed in accordance with the principles of this invention, showing a portion of a cabinet to which it may be attached; Fig. 2 is a somewhat enlarged vertical longitudinal section thereof taken on the line 2—2 in Fig. 1, certain portions, however, being shown in elevation for the sake of clearness and other portions being omitted for the same purpose; Fig. 3 is a vertical transverse section taken on the line 3—3 in Fig. 1; Figs. 4 and 5 are perspective views of certain details of the motor; and Fig. 6 is a fragmentary elevation of a portion of one end of the motor, showing a portion of the winding mechanism.

Referring to the drawings, one embodiment of this invention consists in a frame 1, which is provided with integral downwardly depending arms 2 and 3. This frame may be secured to the underside of a portion of a talking machine cabinet 5 by means of a plurality of screws 6 threaded into suitable apertures 8 in the frame 1, or it may be secured to the cabinet, or other object, in any other suitable manner.

The downwardly extending supports 2 and 3 are provided with preferably cylindrical apertures 12 and 13, the aperture 12 forming a bearing for the shaft 15 and the aperture 13 preferably forming a seat for the bushing 16. This bushing is preferably provided with a central cylindrical aperture 17 forming a bearing for the reduced portion 18 at one end of the shaft 15, and may furthermore be provided with an annular peripheral groove 20 for a purpose to be hereinafter described. One face of the bushing 16 may be provided with a hollow annular depression 22 surrounding the aperture 17, or the annular depression 22 may be omitted if desired. The shaft 15 is provided near the reduced portion 18 with a transverse pin 19, the ends of which project slightly beyond the periphery of the shaft for a purpose to be hereinafter described. The other end of the shaft 15 is journaled in the aperture 12 of the support 3, and extending through the said support, is preferably slightly reduced in diameter to form a shoulder 24. Upon this reduced portion of the shaft 15 is axially mounted a ratchet wheel 26 which is held in position abutting against the shoulder 24 by the nut 27 threaded on to the reduced portion of the shaft as shown in Fig. 2. The ratchet wheel 26 may be secured upon the shaft 15 in any desired manner which will prevent its rotation upon the shaft, but will permit of its being slid along the shaft and removed therefrom when the nut 27 is removed. One way of accomplishing this result is to mill off the sides of the reduced portion of the shaft so as to form slightly flattened surfaces in diametrically opposite relation, and to form the central aperture in the ratchet wheel 26 with correspondingly flattened surfaces, in the manner shown in Fig. 6, or any other suitable arrangement for effecting this desired result may be adopted. The extreme outer end of the shaft 15 is formed with screw threads 30, or other suitable means for the attachment of a removable winding crank, not shown, and, if desired, the shaft 15 may be reduced in diameter at certain portions 31 of its length intermediate of its ends, as shown in Fig. 2, for a purpose to be hereinafter described. Pivoted to the support 3 by a suitable pivot 32 is a ratchet 33 which engages with the teeth of the ratchet wheel 26 in the ordinary well-known manner, to permit the said wheel, together with the shaft 15, to be rotated in one direction, but to prevent their rotation in the other.

The motive power of the spring motor is furnished by the expansion of a plurality of coiled springs 40. These springs of which there may be any number desired, are all wound in the same direction and are separately incased in cylindrical spring barrels 41, 42 and 43, conveniently cup-shaped and provided with a slightly annular off-set portion 44 around the periphery of its open end. A circular cover plate 45 forms a cover for each spring barrel, and is of such a diameter as to snugly fit within the off-set portion 44 where it is retained preferably by friction alone. Each of the spring barrels is preferably provided in the center of its closed end with a circular aperture in which is fixedly retained an annular clutch collar 50, best shown in Fig. 4, which is provided with a central cylindrical aperture 51 of a diameter adapted to form a good working fit upon the shaft 15, and with two or more outwardly projecting dogs 53, for a purpose to be hereinafter described. Upon the face opposite that from which the dogs 53 project, the clutch collars 50 are preferably provided with a somewhat reduced cylindrical off-set portion of approximately the thickness of the walls of the spring barrel and rigidly secured within the central aperture thereof. Each of the cover plates 45 is likewise provided with a similar central aperture in which is fixedly retained in a similar manner a collar 58 which is likewise provided with a slightly off-set cylindrical portion adapted to fit within the aperture, and with a central cylindrical aperture similar to the apertures 51 in the clutch collar 50 for a purpose to be hereinafter described.

Each of the spring barrels 41, 42 and 43 incloses a coiled spring 40, as previously stated, the outer end of which is attached thereto by means of a rivet 60, and the inner end of which is attached to a sleeve 61 by means of a rivet 62 in an aperture 63, or any other desired manner of fastening the ends of the spring may be employed instead of the rivets. The sleeves 61 which are all of identical construction, are provided with a central cylindrical longitudinal aperture forming a good working fit upon the shaft 15. One end of each of these sleeves, which are best shown in Fig. 5, is provided with a plurality of recesses 64 adapted to receive the clutch dogs 53 upon the plates 50. It will be understood that while but two of these clutch dogs and a corresponding number of recesses are shown upon each collar and sleeve in the drawings, that any desired number may be employed. The other end of each of the sleeves is formed with a plane surface. If desired, the sleeves may be slightly reduced in external diameter at the end upon which the recesses 64 are located, as shown in Fig. 5, this reduced portion forming a snug working fit within the apertures already referred to in the collars 58.

It will thus be seen that when each of the spring barrels is assembled with the spring 40 within it and the cover plate 45 in place, that the sleeve 61 will lie centrally within the spring barrel, the end of the sleeve having the recess 64 projecting somewhat within the collar 58, and the other end of the sleeve being in contact with or extending to within a very short distance of the inner side of the collar 50, a very slight clearance space 67 being preferably left between it and the collar 50, this clearance being shown on an exaggerated scale in the drawings. It will be further understood, that each of the spring barrels, with its cover plate and their attached parts together with its corresponding spring, and its central sleeve, may thus be considered as in unitary relation, the whole being completely self-contained and forming a unit adapted to be inserted or withdrawn from the motor as such when desired.

The spring barrel 43, however, is formed preferably in a slightly different shape from the other spring barrels, it being preferably provided with a plurality of raised bosses 70, having suitable apertures for the accommodation of the rivets 71 by means of which a gear wheel 73 is fixedly attached to the spring barrel 43, being slightly off-set from the same by the bosses 70. This gear wheel may be attached to the spring barrel in any other manner desired, however, and can, if it be considered advisable, be arranged to be readily removed therefrom, although in the drawings, it is shown as permanently attached. This gear wheel, which is for the purpose of communicating the power developed by the springs to the gearing of the motor, preferably meshes with a worm 74 upon the main shaft 75 of the motor, said shaft being suitably journaled in the frame 1 and carrying a gear 76, which in turn meshes with a worm 77. The upper end of the main shaft 75 extends through a bearing 78 in the frame 1 of the motor and is continued upward as shown in Fig. 2, passing through the cabinet 5 for the purpose of carrying a turntable or other device, not shown. The shaft carrying the worm gear 77 is journaled in the frame 1 in journals 79, and is provided with a centrifugal governor 80, carrying a longitudinally movable friction disk 81, the travel of which along the shaft is controlled by the movable friction brake 83, in a well known manner.

The spring barrel 43 further differs from the spring barrels 41 and 42, in that it is provided with a slightly modified form of collar 85 from which the clutch dogs 53 are omitted. In place of these dogs, the collar is provided with a cylindrical extension 86 adapted to enter a shallow annular recess 88 in the support 3, and to bear against the bottom of the said recess, a good bearing surface being formed between the end of the cylindrical extension 86 and the bottom of the recess 88.

A drip pan 90 is preferably attached to the lower portion of the support 3 by means of the screws 91, or in any other desired manner, and extends beneath the several spring barrels of the motor. This pan may preferably be curved concentrically with the spring barrels, and may be provided with end portions 92 and 93, the whole forming a sort of trough-shaped device. That portion of the pan beneath the gear wheel 73 is preferably of a slightly greater radius of curvature than the balance of the pan, so that a groove 95 is formed beneath the gear wheel for the purpose of containing vaseline or other lubricant into which the gear wheel 73 dips as it rotates. Both the gear wheel 73 and the worm 74, are thus kept constantly lubricated, it being only necessary to renew the supply of vaseline at infrequent intervals in order to insure this result.

When it is desired to assemble the motor, the main shaft 75, and speed controlling means being in place upon the frame, the various spring units, each comprising its spring barrel and cover with their attached parts, its sleeve and its spring, are placed in any desired order, excepting that the spring unit having the gear wheel 73 should be nearest the support 3, and are rotated until the clutch dogs 53 of the several units enter the corresponding apertures 64 in the several sleeves, as shown in Fig. 2. The spring units, being held in this interlocked position, are then slipped between the depending portions 2, and 3, of the frame 1 and the shaft 15 inserted through the aperture 13 in the support 2 and through the apertures in the several sleeves, its right hand end, considering Fig. 2, finally passing through the aperture 12 in the support 3. In this position, the transverse pin 19 in the left hand end of the shaft will enter the recesses 64 in the end of the sleeve within the left hand spring unit, as shown in Fig. 2. The bushing 16 is then inserted in the aperture 13 and moved longitudinally along the reduced portion 18 of the shaft until it contacts with the shoulder formed by the reduced portion, in which position it is secured by means of the set screw 100, which is threaded into the support 2 and enters the annular groove 20 of the bushing.

It will thus be understood that beginning with the left hand spring unit, considering Fig. 2, each spring barrel is held in fixed interlocked relation with the sleeve contained in the next adjacent spring unit, and that the sleeve contained in the left hand spring unit is held in fixed relation with the shaft 15, by the protruding ends of the pin 19 engaging within the recesses 64 provided in the end of its sleeve. Furthermore, the spring units are restrained from substantial longitudinal movement along the shaft 15 by the transverse pin 19, and by the contact of the end of the cylindrical extension 86 of the collar 85 with the bottom of the recess 88, while the shaft 15 is also restrained from substantial longitudinal movement in one direction by the contact of the bushing 16 with the shoulder formed on the shaft 15 by its reduced portion 18, and in the other direction by the contact of the transverse pin 19 with the sleeve contained in the left hand spring unit.

The shaft being thus fixed in position, the ratchet wheel 26 is slipped over the end thereof, and turned so that the flattened surfaces of its central aperture register with the similar surfaces upon the shaft 15, and the nut 27 may then be screwed into position, thus binding the ratchet wheel firmly upon the shaft 15. The pan 90 may then be attached by the screws 91 and the groove 95 filled with lubricant. By the attachment of a winding crank to the shaft 15 by means of the threads 30, or in any other suitable manner, the shaft may be rotated in one direction, rotation in the other direction being prevented by the engagement of the ratchet 33 with the teeth of the ratchet wheel 26 in the well-known manner. The rotation of the shaft will immediately cause the rotation of the sleeve within the left hand unit owing to the contact of the transverse pin 19 with the clutch recesses in said sleeve. Such rotation will cause the spring within the spring barrel 41 to be wound up and, as this spring gathers power, the sleeve within the next unit having the spring barrel 42, will in turn be rotated through the engagement of the clutch dogs 53 upon the clutch collar 50, with the clutch in that sleeve, thus winding the spring within the spring barrel 42, and, in turn, the spring within the next unit having the spring barrel 43 will also be wound up in a similar manner. Of course, it will be understood that during this winding process, the spring barrel 43 does not revolve, the teeth of the gear wheel 73 in mesh with the worm 74 preventing the movement of the barrel. However, when the speed controlling means 83 or other braking means employed are released and the motor permitted to run, the expansion of the spring within the spring barrel 43 will cause the said barrel to revolve together with the gear 73, communicating motion to the worm 74, the rate of which motion is controlled by the governing mechanism in a well known manner. The spring barrel 42 will also thus begin to revolve, but at a slower rate than does the spring barrel 43, and consecutively the spring barrel 41 will revolve but at a still slower rate. The shaft 15 does not revolve except when the motor is being wound, which operation may be carried on while the motor is running, if desired, but nevertheless, serves to keep the various moving parts in constant and perfect alinement, preventing distortion and minimizing friction.

The friction between the revolving sleeves contained in the spring barrels 42 and 43 and the shaft 15 may be somewhat reduced by decreasing the diameter of the shaft through a considerable portion of the length of its contact with the said sleeves, as at 31, as clearly shown in Fig. 2, or, if desired, the shaft may be made of a constant diameter.

If it be desired to dismantle the motor, the same may be very readily accomplished by a practical reversal of the assembling process. The drip pan 90 is first removed by withdrawing the screws 91, and the nut 27 having been removed, the ratchet wheel 26 may be readily slipped off the shaft. The set screw 100 is next loosened and the bushing 16 removed, after which the shaft 15 may be withdrawn, and all the spring units lifted from between the supports 2 and 3 and separated, leaving each unit with its associated parts entirely independent of the other units.

It will thus be seen that a motor of a construction similar to that described, may be very readily assembled or disassembled and that such labor does not require the services of a skilled mechanic. Furthermore, in case of injury to any one of the spring units, the same may be entirely removed from the motor and a new unit inserted without the necessity of sending the whole motor away for repairs, and since the springs are contained within dust proof barrels lubricant may be introduced between the coils of the springs at the factory, which will serve to lubricate them for a long period of time, while the principal gearing of the motor may be readily lubricated by the periodical introduction of vaseline within the groove 95.

Of course it will be understood, that while I have illustrated the motor as having three spring units, any number of spring units may be employed, one of the principal advantages of my invention residing in the fact that large quantities of the spring units may be manufactured and later used without alteration in the construction of motors having frames and shafts designed for use with two, three, four or more units as desired.

A further advantage of a motor constructed in accordance with this invention consists in the use of a unitary frame therein, which frame can be readily formed as an integral whole, dispensing with the necessity, as in motors previously constructed, of attaching one or more of the portions thereof by mechanical means, which portions frequently have to be removed in assembling or disassembling the motor. The numerous advantages arising from the ability to make use of such a unitary frame construction will be at once apparent.

Furthermore, I do not desire to limit my invention to the precise details of construction and arrangement which have been herein set forth, as it is obvious that various modifications in the structure and arrangement of the various parts may be made therein without departing from the essential features and scope of the invention as defined in the appended claims.

Having thus fully described my invention, what I claim and desire to protect by Letters Patent of the United States is:

1. In a spring motor, the combination of a winding shaft, separate spring units movably mounted on the shaft, clutches connecting the adjacent spring units and movable into and out of engagement in the direction of said shaft, means for holding said units against movement longitudinally of the shaft and means for transmitting the motion of said units to a main shaft.

2. In a spring motor, the combination of a series of separate spring units, separable interlocking means connecting the adjacent spring units and movable into and out of engagement by the independent movement of one of said adjacent units relative to, in contradistinction to about, the axis of said series of units, and a central winding shaft removably inserted through said series of units and holding the same against movement relative to said axis.

3. In a spring motor, the combination of a shaft, separate sleeves mounted on the shaft, a power spring connected to each of the separate sleeves, spring barrels connected to each of the respective springs, and clutches forming interlocking connections between the sleeve of each spring and the barrel of the next adjacent spring.

4. In a spring motor, the combination of a shaft, separate spring units movably mounted on the shaft, clutches forming interlocking connections between adjacent spring units, and means for holding the shaft in operative position.

5. In a spring motor, the combination of a shaft, separate spring barrels rotatably mounted on the shaft, springs within the spring barrels, a sleeve within one of said barrels and independently rotatable on the shaft and connected to the corresponding spring, and interlocking clutch means provided respectively on one end of said sleeve and on the face of the adjacent spring barrel.

6. A power unit for spring motors, including a spring barrel open at one end and closed at the other end, a cover plate for the open end of the barrel, said cover plate and the closed end of the barrel being formed with substantially central alining apertures, a sleeve within the barrel independently rotatable thereof and adapted to register and communicate with said apertures, a power spring connecting the sleeve and the barrel, the sleeve being journaled at one end in one of said apertures, and a clutch member provided at said end of the sleeve.

7. A power unit for spring motors, including a spring barrel open at one end and closed at the other end, a cover plate for the open end of the barrel, said cover plate and the closed end of the barrel being formed with substantially central alining apertures, a sleeve within the barrel rotatable independently thereof and adapted to register and communicate with said apertures, a power spring connecting the sleeve and the barrel, the sleeve being journaled at one end in one of said apertures, a clutch member provided at said end of the sleeve, and a clutch member provided adjacent the other aperture.

8. A power unit for spring motors including a spring barrel open at one end and closed at the other end, and formed in its closed end with a substantially central aperture and with a clutch member located adjacent said aperture, a cover plate for the open end of the barrel, having a substantially central bearing opening alining with said aperture, a sleeve within said barrel rotatable independently thereof and adapted to register with said aperture, the sleeve being provided at one end with a clutch member and being journaled at said end within the bearing opening and a power spring connecting the sleeve and the barrel.

9. In a spring motor, the combination of a plurality of separate spring units, each provided with a central independently rotatable sleeve, a shaft removably inserted through all of said sleeves, clutch members for connecting the sleeve of a terminal unit to the shaft, and means including clutch members on remaining sleeves, for coupling adjacent spring units.

10. A spring motor, including separate spring units, each provided with an independently rotatable central sleeve, a shaft positioned through all of said sleeves, and means including clutch members on said sleeves, for coupling adjacent spring units.

11. In a spring motor, the combination of a plurality of separate spring units, each provided with a central sleeve rotatable independently thereof, a central shaft through the sleeves, means for connecting the sleeve of a terminal unit to said shaft, the shaft being removable from the remaining sleeves, and means including clutch members on the remaining sleeves, for coupling adjacent spring units.

12. The combination in a multiple spring motor having a series of spring units, of a gear mounted on one of said units and a pan provided with a lubricant retaining groove extending beneath said units, said gear being adapted to revolve partially within said groove.

13. The combination in a multiple spring motor having a series of spring units, of a gear mounted upon one of the terminal units of said series and a pan provided with a transversely extending lubricant retaining groove, said gear being adapted to revolve partially within said groove.

14. In a spring motor, the combination of a plurality of separate spring units, clutches forming interlocking connections between adjacent spring units, a central shaft removably inserted through all of said spring units, a separable interlocking connection between said shaft and a terminal spring unit, and means for holding said shaft from longitudinal movement.

15. In a spring motor, the combination of a motor frame including a base and supporting arms projecting therefrom, and provided with alining bearings, a plurality of spring units having freely separable connections interposed between said arms, and a shaft passing through said units and supported in said bearings and freely removable axially from said parts.

16. In a spring motor, the combination of a plurality of spring units, freely separable connections therebetween, a central shaft removably inserted through all of said units, a separable interlocking connection between said shaft and a terminal spring unit, and means for retaining said shaft against withdrawal from operative position.

17. In a spring motor, the combination of a motor frame including a base and supporting arms projecting therefrom, said arms being provided with alining bearings, a plurality of separate spring units interposed between said arms, separable operative connections between adjacent spring units, a central shaft passing through all of said units and supported in said bearings and removable axially from position.

18. In a spring motor, the combination of a motor frame including a base and supporting arms projecting therefrom and integral therewith, said arms being provided with alining bearings, a plurality of spring units having freely separable connections interposed between said arms, and a shaft passing through said units and supported in said bearings and freely removable axially from said parts.

19. In a spring motor, the combination of a shaft, separate spring units movably mounted on the shaft, freely separable interlocking connections between adjacent spring units, and means for holding said spring units in operative position on the shaft with said connections in interlocking engagement.

In witness whereof, I have hereunto set my hand this 19th day of March, A. D. 1913.

WILLIAM D. LA RUE.

Witnesses:
FRANK B. MIDDLETON, Jr.,
JOHN D. MYERS.